(12) United States Patent
Marutani et al.

(10) Patent No.: US 8,919,815 B2
(45) Date of Patent: Dec. 30, 2014

(54) STEERING APPARATUS FOR A VEHICLE

(75) Inventors: Takeshi Marutani, Tokai (JP); Morito Oshita, Kariya (JP); Hidetoshi Inayoshi, Nukata-gun (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 127 days.

(21) Appl. No.: 13/808,224

(22) PCT Filed: Oct. 11, 2011

(86) PCT No.: PCT/JP2011/073290
§ 371 (c)(1),
(2), (4) Date: Jan. 3, 2013

(87) PCT Pub. No.: WO2012/053384
PCT Pub. Date: Apr. 26, 2012

(65) Prior Publication Data
US 2013/0104689 A1    May 2, 2013

(30) Foreign Application Priority Data

Oct. 18, 2010   (JP) .................................. 2010-233471

(51) Int. Cl.
*B62D 1/189* (2006.01)
*B62D 1/184* (2006.01)
*B62D 1/183* (2006.01)
*B62D 1/187* (2006.01)

(52) U.S. Cl.
CPC ............... *B62D 1/187* (2013.01); *B62D 1/189* (2013.01); *B62D 1/184* (2013.01); *B62D 1/183* (2013.01)
USPC ............................ 280/775; 280/779; 74/493

(58) Field of Classification Search
CPC ........ B62D 1/187; B62D 1/189; B62D 1/183; B62D 1/184; B62D 1/185; B62D 1/18
USPC ............................. 74/493, 492; 280/779, 775
See application file for complete search history.

(56) References Cited

U.S. PATENT DOCUMENTS

| | | | | |
|---|---|---|---|---|
| 6,036,228 | A | * | 3/2000 | Olgren et al. ................. 280/775 |
| 7,125,047 | B2 | * | 10/2006 | Lee ............................... 280/777 |
| 2009/0199673 | A1 | * | 8/2009 | Tinnin ........................... 74/493 |

FOREIGN PATENT DOCUMENTS

| | | |
|---|---|---|
| FR | 2 794 419 A1 | 12/2000 |
| JP | 2-142373 U | 12/1990 |
| JP | 2001-001914 A | 1/2001 |

(Continued)

OTHER PUBLICATIONS

International Search Report (PCT/ISA/210) issued on Nov. 8, 2011, by the Japanese Patent Office as the International Searching Authority for International Application No. PCT/JP2011/073290.

(Continued)

*Primary Examiner* — Keith Frisby
(74) *Attorney, Agent, or Firm* — Buchanan Ingersoll & Rooney PC

(57) ABSTRACT

A tilting mechanism is provided with a movable column member for pivotally supporting a steering column to be swung about a swinging center provided at a front part of a vehicle body, and a movable bracket holding it. A lift-up mechanism is provided with a fixing bracket fixed to the vehicle body, and a link member with one end thereof being supported rotatably on the movable bracket, and the other one end thereof being disposed to be engaged with and removed from the fixing bracket. A lift-up biasing portion (spring member) biases the movable bracket in a direction to be lifted up from the fixing bracket. A lift-up manipulating lever selectively provides a hold state for engaging the link member with the fixing bracket to hold the movable bracket at an initial position or a lift-up position, and a release state for releasing its engagement.

9 Claims, 3 Drawing Sheets

(56) References Cited

FOREIGN PATENT DOCUMENTS

| | | |
|---|---|---|
| JP | 2005-132288 A | 5/2005 |
| JP | 2006-137386 A | 6/2006 |
| JP | 2009-029325 A | 2/2009 |

OTHER PUBLICATIONS

Extended European Search Report Issued Oct. 18, 2013, by the European Patent Office in corresponding European Patent Application No. 11834224.5. (5 pages).

* cited by examiner

STEERING APPARATUS FOR A VEHICLE

TECHNICAL FIELD

The present invention relates to a steering apparatus for a vehicle, and more particularly to the steering apparatus provided with a tilting mechanism and a lift-up mechanism.

BACKGROUND ART

According to the recent vehicles, there is known a steering apparatus provided with a tilting mechanism which is capable of adjusting a manipulating position of a steering wheel, and a lift-up mechanism which is capable of holding the steering wheel at a predetermined lift-up position. For example, in the following Patent document 1, a tilt steering apparatus with a memory mechanism has been proposed, with respect to "a tilt steering apparatus for enabling a height of a steering wheel to be changed according to physique of a driver, driving posture and the like, wherein the apparatus is made easier in getting on and off, by lifting (tilting up) the steering wheel up to its uppermost position with a lever being manipulated, so as to prevent the steering wheel from obstructing the getting on and off" as described in its paragraph [0002], and in its paragraph [0013] disclosed is an embodiment for "acting a holding force in such a state that a tilt-lock and a memory lock are achieved, a state that only the tilt-lock is achieved, and a state that both locks are released, according to rotation of a manipulating lever, respectively". Furthermore, in the following Patent document 2, as for a steering column apparatus "provided with a lift-up mechanism and a tilting mechanism separately" as described in its paragraph [0001], there is disclosed an apparatus provided with a motor driven lift-up mechanism.

PRIOR ART DOCUMENT

Patent Document

Patent Document 1:
Japanese Patent Laid-open Publication No. 2001-1914
Patent Document 2:
Japanese Patent Laid-open Publication No. 2009-29325

SUMMARY OF THE INVENTION

Problems to be Solved by the Invention

According to the tilt steering apparatus as disclosed in the above Patent document 1, although the lift-up amount and tilting amount can be adjusted according to the operating amount of the manipulating lever, the lift-up amount comes to be changed depending upon the adjusted tilting position, and therefore, in the case where the maximum adjusted tilting position has been set, for example, the lift-up amount becomes small. In contrast, according to the steering column apparatus as disclosed in the above Patent document 2, the lift-up mechanism and the tilting mechanism are provided independently, so that it can be avoided to influence each other as described above. However, since not only the tilting mechanism but also the lift-up mechanism are to be driven by motors, complicated mechanisms will be required, to result in an expensive apparatus.

Therefore, according to the present invention, in the steering apparatus provided with the tilting mechanism and lift-up mechanism, it is an object to provide an inexpensive steering apparatus which is capable of manipulating the tilting mechanism and the lift-up mechanism independently, and capable of manipulating at least the lift-up mechanism easily by a manual operation of a vehicle driver.

Means for Solving the Problems

To solve the above-described problems, according to the present invention, in a steering apparatus for a vehicle, which is provided with a tilting mechanism which is capable of adjusting a manipulating position of a steering wheel, and a lift-up mechanism which is capable of holding the steering wheel at a predetermined lift-up position, the tilting mechanism is provided with a movable column member for pivotally supporting the steering column to be swung about a swinging center provided at a front part of the vehicle body, and a movable bracket holding the movable column member between a pair of holding portions facing each other, and the lift-up mechanism is provided with a fixing bracket fixed to the vehicle body, and a link member with one end thereof being supported rotatably on the movable bracket, and the other one end thereof being disposed to be engaged with and removed from the fixing bracket at a rear part of the vehicle body, wherein the steering apparatus is provided with a lift-up biasing portion which biases the movable bracket in a direction to be lifted up from the fixing bracket, and a manipulating lever which selectively provides a hold state for engaging the link member with the fixing bracket to hold the movable bracket at an initial position or a lift-up position, and a release state for releasing the engagement of the link member with the fixing bracket.

In the steering apparatus as described above, a supporting position of one end of the link member relative to the movable bracket and a supporting position of the other one end of the link member relative to the fixing bracket, in such a state that the movable bracket is held at the initial position, may be disposed to be placed on a single arc about the swinging center, respectively. The lift-up biasing portion may be formed by a spring member installed between the fixing bracket and the movable bracket.

Also, in the steering apparatus as described above, the fixing bracket may be provided with a plurality of grooves opened toward the rear part of the vehicle body relative to the arc, and the link member may be provided with an engaging portion to be engaged with each of the plurality of grooves.

Furthermore, in the steering apparatus as described above, it may further comprise an engaging biasing portion installed between the movable bracket and the link member for biasing the link member in a direction to be engaged with the fixing bracket. The engaging biasing portion may be formed by a spring member to be installed between the link member and the movable bracket.

And, the steering apparatus as described above may further comprise a lateral biasing portion which prevents the movable bracket from being moved in a lateral direction, which is perpendicular to an axial direction of the steering column. The lateral biasing portion may be formed by a spring member installed between the fixing bracket and the movable bracket for biasing the movable bracket in the lateral direction.

Furthermore, the steering apparatus as described above may further comprise a telescopic mechanism which extends or shrinks the movable column member in the axial direction of the steering column, to adjust the manipulating position of the steering wheel.

Effects of the Invention

As the present invention has been configured as described above, the following effects are achieved. That is, according to the steering apparatus of the present invention, the tilting mechanism is provided with a movable column member for pivotally supporting the steering column to be swung about a swinging center provided at a front part of a vehicle body, and a movable bracket holding the movable column member between a pair of holding portions facing each other, and the lift-up mechanism is provided with a fixing bracket fixed to the vehicle body, and a link member with one end thereof being supported rotatably on the movable bracket, and the other one end thereof being disposed to be engaged with and removed from the fixing bracket at a rear part of the vehicle body, and by means of the lift-up biasing portion, the movable bracket is biased in a direction to be lifted up from the fixing bracket, and by means of the manipulating lever, the hold state for engaging the link member with the fixing bracket to hold the movable bracket at the initial position or lift-up position and the release state for releasing the engagement of the link member with the fixing bracket are configured to be capable of being selectively provided, whereby the tilting mechanism and the lift-up mechanism can be manipulated independently, and also, with the manipulating lever being operated manually by the vehicle driver, the lift-up mechanism can be manipulated easily and surely to hold the initial position or the lift-up position, or place the release state.

Particularly, in the case where the supporting position of one end of the link member relative to the movable bracket held in its initial position and the supporting position of the other one end of the link member relative to the fixing bracket are disposed to be placed on the single arc about the swinging center, respectively, the steering apparatus having an inexpensive lift-up mechanism with high rigidity can be provided, without requiring any locking mechanism additionally.

And, if it is provided with the fixing bracket having a plurality of grooves and the link member having the engaging portion to be engaged with each of the plurality of grooves, an easily assembled and inexpensive lift-up mechanism can be configured. Furthermore, if the engaging biasing portion is installed between the movable bracket and the link member, and it is so configured to bias the link member in a direction to be engaged with the fixing bracket, the lift-up mechanism can be easily shifted into the state for holding the initial position or lift-up position.

In addition to the above, if it is provided with the lateral biasing portion as described before, the movable bracket can be prevented surely from being moved in a lateral direction, so that the lift-up manipulation can be performed in a stable state. Furthermore, if it is provided with the telescopic mechanism, the lift-up mechanism can be operated easily and surely by manual operation of the vehicle driver, even for the steering column having both of the tilting mechanism and the telescopic mechanism.

EMBODIMENTS FOR CARRYING OUT THE INVENTION

Figure 1:
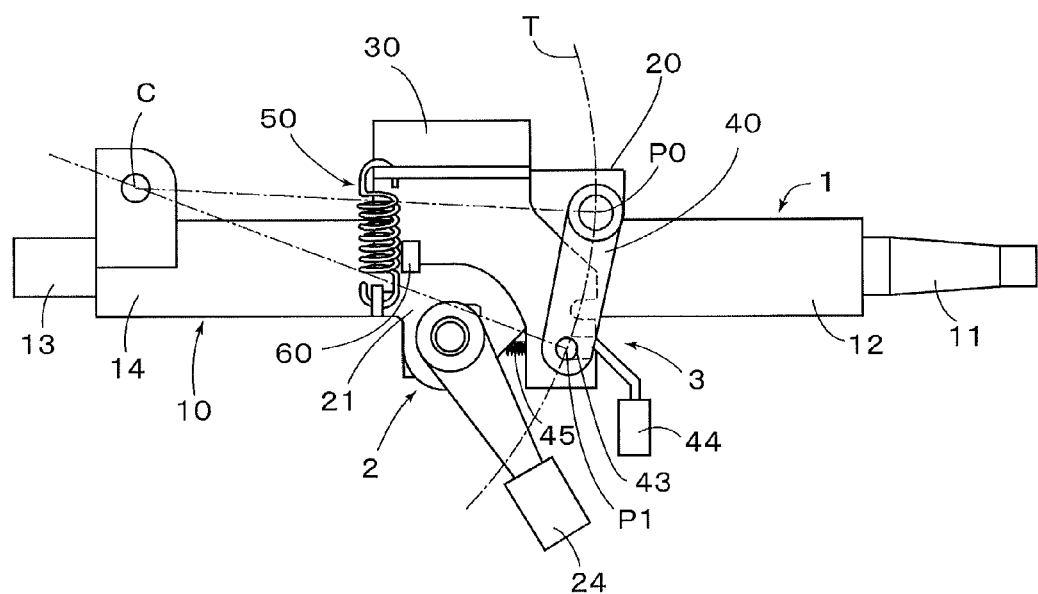
FIG. 1 is a side view of a steering apparatus according to an embodiment of the present invention.
Figure 2:
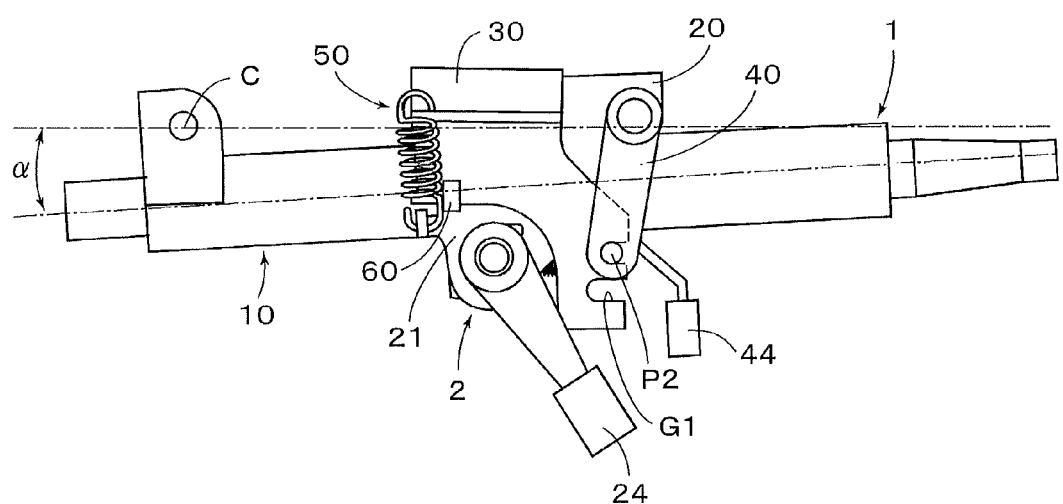
FIG. 2 is a side view of a steering apparatus according to an embodiment of the present invention, showing its lift-up state.

Hereinafter, will be explained a desirable embodiment of the present invention referring to drawings. FIGS. 1-4 show a steering apparatus according to an embodiment of the present invention, wherein a steering column 1 is pivotally mounted on a vehicle body (not shown) to be swung, and wherein there are disposed a tilting mechanism 2 which is capable of adjusting a manipulating position of a steering wheel (not shown), and a lift-up mechanism 3 which is capable of holding the steering wheel at a predetermined lift-up position. According to the present embodiment, the steering wheel is supported at a rear end of an upper shaft 11, and an upper tube 12 is disposed coaxially so as to enclose it, so that the upper shaft 11 and upper tube 12 are configured to be movable as one body in an axial direction thereof. On the other hand, a lower tube 14 is disposed coaxially so as to enclose a lower shaft 13 connected to a steering mechanism (not shown), and the upper tube 12 is slidably received in the lower tube 14 in an axial direction thereof, whereby a telescopic mechanism is configured. In FIGS. 1 and 2, the lower tube 14 and the upper tube 12 are indicated together as a movable column member 10.

Figure 4:
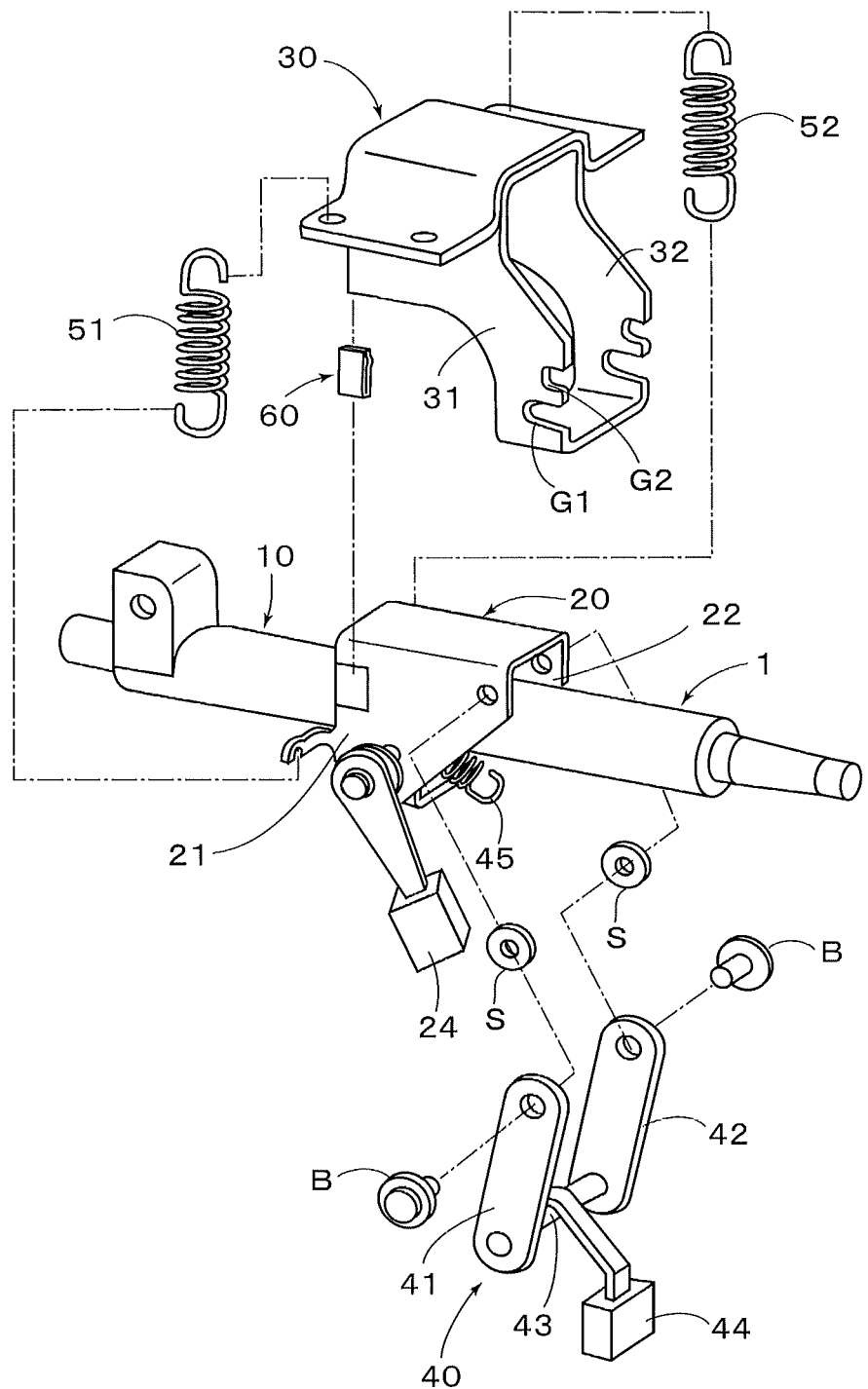
FIG. 4 is a perspective view of a steering apparatus with parts thereof being disassembled, according to an embodiment of the present invention.

The above-described tilting mechanism 2 is provided with the movable column member 10 for pivotally supporting the steering column 1 to be swung about a swinging center (C) provided at a front part of the vehicle body, and a movable bracket 20 holding the movable column member 10 between a pair of holding portions 21, 22 facing each other (shown in FIG. 4).

Also, the lift-up mechanism 3 is provided with a fixing bracket 30 fixed to the vehicle body, and a link member 40 with one end thereof being supported rotatably on the movable bracket 20, and the other one end thereof being disposed to be engaged with and removed from the fixing bracket 30 at a rear part of the vehicle body. And, as the lift-up biasing portion for biasing the movable bracket 20 in a direction to be lifted up from the fixing bracket 30, a spring member 50 comprising a pair of tension coil springs 51 and 52 (shown in FIG. 4) is mounted. Furthermore, there is disposed a lift-up manipulating lever 44 which is capable of selectively providing a hold state for engaging the link member 40 with the fixing bracket 30 to be held at an initial position (P1 in FIG. 1) or a lift-up position (P2 in FIG. 2), and a release state for releasing the engagement of the link member 40 with the fixing bracket 30.

The fixing bracket 30 has a pair of holding portions 31, 32 (shown in FIG. 4), each of which is formed with a plurality of grooves G1, G2 opened toward the rear part of the vehicle body relative to a single arc (arc T as shown in FIG. 1) forming a swinging locus of the movable bracket 20 about the swinging center (C). Also, the link member 40 has a pair of links 41, 42, which are connected together via a link 43, and which are screwed by bolts B, respectively. Tip end portions of the bolts B are rotatably supported on the holding portions 21, 22 of the movable bracket 20 via spacers S, respectively. Instead of the bolts B, pins (not shown) may be pressed into the links 41, 42. The link 43 can be engaged with each of the plurality of grooves G1, G2, whereby an engaging portion of the link member 40 to be engaged with the fixing bracket 30 is configured. On a center portion of the link 43, fixed is the lift-up manipulating lever 44. In response to operation of the lift-up manipulating lever 44, the link member 40 is configured so as to be swung about a supporting position (P0 in FIG. 1) placed at its one end, relative to the movable bracket 20. Furthermore, a tension coil spring 45 is installed between the movable bracket 20 and the link member 40, to be served as engaging biasing portion, by which the link member 40 (link 43) is biased in a direction to be engaged with the fixing bracket 30 (grooves G1, G2).

Then, in such a state that the movable bracket 20 is being held at its initial position (the state as shown in FIG. 1), the supporting position (P0 in FIG. 1) of one end of the link member 40 relative to the movable bracket 20 and the supporting position (P1 in FIG. 1) of the other one end of the link member 40 relative to the fixing bracket 30 are disposed to be placed on the single arc (arc T as shown in FIG. 1), which forms the swinging locus of the movable bracket 20 about the swinging center (C). Furthermore, even in such a state that the movable bracket 20 is being held at its lift-up position (the state as shown in FIG. 2), the supporting position (P0 in FIG. 1) of one end of the link member 40 relative to the movable bracket 20 and the supporting position (P2 in FIG. 2) of the other one end of the link member 40 relative to the fixing bracket 30 may be disposed to be placed on the single arc (arc T as shown in FIG. 1), which forms the swinging locus of the movable bracket 20 about the swinging center (C).

Furthermore, as the lateral biasing portion which prevents the movable bracket 20 from being moved in a lateral direction, which is perpendicular to an axial direction of the steering column 1, a leaf spring 60 is installed between the movable bracket 20 and the fixing bracket 30, to bias the movable bracket 20 in the lateral direction, thereby to function as a spring member which prevents a lateral looseness against the fixing bracket 30. As the lateral biasing portion, a resilient member such as rubber may be used.

Figure 3A:
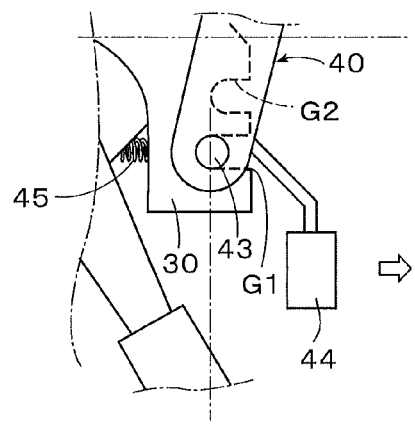
FIG. 3(A) is a side view showing a relationship between a link member and a fixing bracket prior to a lift-up manipulation, according to an embodiment of the present invention.
Figure 3B:
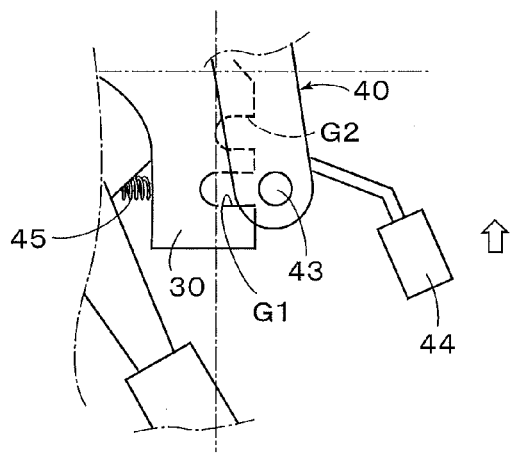
FIG. 3(B) is a side view showing a relationship between a link member and a fixing bracket when a manipulating portion is drawn rearward of a vehicle body, according to an embodiment of the present invention.
Figure 3C:
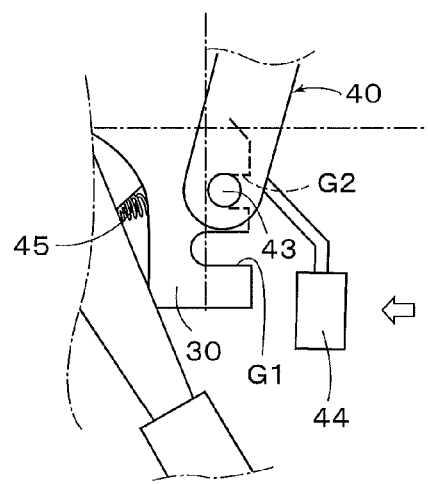
FIG. 3(C) is a side view showing a relationship between a link member and a fixing bracket when the manipulating portion is released, according to an embodiment of the present invention.

According to the steering apparatus as configured above, a lift-up manipulation by means of the lift-up mechanism 3 will be explained with reference to FIGS. 3(A)-5(C). FIG. 3(A) shows a state prior to the lift-up manipulation, wherein the link 43 of the link member 40 is held at its initial position (P1 in FIG. 1) to be engaged with the groove G1 of the fixing bracket 30. From this hold state, when the lift-up manipulating lever 44 is drawn rearward of the vehicle body (in a direction of a white arrow), the link 43 is released from the groove G1, as shown in FIG. 3(B), so that the link member 40 is released from its engagement with the fixing bracket 30. Then, the link member (resultantly the movable bracket 20 and the movable column member 10) is moved toward the lift-up direction (in a direction of a white arrow) by means of the biasing force of the tension coil springs 51 and 52 (FIG. 4), the steering column 1 is swung about the swinging center (C) to come into such a lift-up state that provides an angle α relative to a horizontal direction, as shown in FIG. 2. And, if the lift-up manipulating lever 44 is released at this position, the link 43 is returned by means of the biasing force of the tension coil spring 45 in a direction to be engaged with the groove G2 (in a direction of a white arrow), as shown in FIG. 3(C), so that the engaged state between the link member 40 (resultantly the movable bracket 20) and the fixing bracket 30 is held. That is, the link 43 of the link member 40 can be easily shifted to the lift-up position (P2 in FIG. 2) engaged with the groove G2 of the fixing bracket 30, so that the hold state can be maintained surely.

According to the present embodiment, therefore, the tilting mechanism 2 and the lift-up mechanism 3 can be manipulated independently. With the lift-up manipulating lever 44 being operated by the vehicle driver, the lift-up mechanism 3 can be manipulated easily and surely, to hold the initial position (FIG. 1) or the lift-up position (FIG. 2), or place the release state. Also, as the supporting position (P0 in FIG. 1) of one end of the link member 40 relative to the movable bracket 20 and the supporting position (at least P1 in FIG. 1) of the other one end of the link member 40 relative to the fixing bracket 30 are disposed to be placed on the single arc (T) about the swinging center (C), respectively, as described before, the lift-up mechanism 3 can maintain its high rigidity, without requiring any locking mechanism additionally.

Furthermore, according to the present embodiment, with a tilt manipulating lever 24 being operated, the steering wheel can be adjusted to a desired manipulating position by the tilting mechanism 2. That is, the tilting manipulation can be performed independently of the lift-up manipulation as described above. Likewise, independently of the lift-up manipulation as described above, the steering column 1 can be moved by the telescopic mechanism as described before, in a direction to be shortened or extended, so that the steering wheel can be adjusted to its desired manipulating position.

Provided that the telescopic function is not required, the upper tube 12 and the lower tube 14 may be formed as one body to provide the movable column member as a single member, and the upper shaft 11 and the lower shaft 13 may be formed as one body, so that a steering apparatus with the tilting function and without the telescopic function can be provided.

DESCRIPTION OF CHARACTERS

1: steering column
2: tilting mechanism
3: lift-up mechanism
C: swinging center
T: swinging locus
10: movable column member
20: movable bracket
24: tilt manipulating lever
30: fixing bracket
40: link member
44: lift-up manipulating lever
50: spring member
60: leaf spring

The invention claimed is:

1. A steering apparatus for a vehicle comprising:
    a steering column for supporting a steering wheel of the vehicle;
    a tilting mechanism having a movable column member for pivotally supporting the steering column to be swung about a swinging center provided at a front part of a vehicle body, and a movable bracket holding the movable column member between a pair of holding portions facing each other, to adjust a manipulating position of the steering wheel;
    a lift-up mechanism having a fixing bracket fixed to the vehicle body, and a link member with one end thereof being supported rotatably on the movable bracket, and the other one end thereof being disposed to be engaged with and removed from the fixing bracket at a rear part of the vehicle body, to hold the steering wheel at a predetermined lift-up position;
    a lift-up biasing portion for biasing the movable bracket in a direction to be lifted up from the fixing bracket; and a manipulating lever which selectively provides a hold state for engaging the link member with the fixing bracket to hold the movable bracket at an initial position or a lift-up position, and a release state for releasing the engagement of the link member with the fixing bracket.

2. A steering apparatus for a vehicle as claimed in claim 1, wherein a supporting position of one end of the link member relative to the movable bracket and a supporting position of the other one end of the link member relative to the fixing bracket, in such a state that the movable bracket is held at the initial position, are disposed to be placed on a single arc about the swinging center, respectively.

3. A steering apparatus for a vehicle as claimed in claim 2, wherein the fixing bracket has a plurality of grooves opened toward the rear part of the vehicle body relative to the arc, and the link member has an engaging portion to be engaged with each of the plurality of grooves.

4. A steering apparatus for a vehicle as claimed in claim 1, wherein the lift-up biasing portion is a spring member to be installed between the fixing bracket and the movable bracket.

5. A steering apparatus for a vehicle as claimed in claim 1, further comprising:

an engaging biasing portion installed between the movable bracket and the link member for biasing the link member in a direction to be engaged with the fixing bracket.

6. A steering apparatus for a vehicle as claimed in claim 5, wherein the engaging biasing portion is a spring member installed between the link member and the movable bracket.

7. A steering apparatus for a vehicle as claimed in claim 1, further comprising:

a lateral biasing portion which prevents the movable bracket from being moved in a lateral direction, which is perpendicular to an axial direction of the steering column.

8. A steering apparatus for a vehicle as claimed in claim 7, wherein the lateral biasing portion is a spring member installed between the fixing bracket and the movable bracket for biasing the movable bracket in the lateral direction.

9. A steering apparatus for a vehicle as claimed in claim 1, further comprising:

a telescopic mechanism which extends or shrinks the movable column member in the axial direction of the steering column, to adjust the manipulating position of the steering wheel.

* * * * *